Oct. 22, 1963 PEIG FENG WU 3,108,195

PARAMETRON SYSTEM

Filed Aug. 18, 1961

*INVENTOR.*

PEIG FENG WU

BY Karl A. Ohralik

ATTORNEY.

United States Patent Office 3,108,195

Patented Oct. 22, 1963

3,108,195

PARAMETRON SYSTEM

Peig Feng Wu, Lexington, Ky., assignor to International Business Machines Corporation, New York, N.Y., a corporation of New York Filed Aug. 18, 1961, Ser. No. 132,361
6 Claims. (Cl. 307—88)

This invention relates to a parametron input circuit apparatus effective to transform binary information in the form of different direct potentials into binary information in the form of alternating potentials of different phases.

In certain electrical circuitry such as may be found in digital computers, binary information is frequently represented by electrical potentials of different magnitudes. As an example, a binary "1" may be represented by a positive potential of at least a predetermined value and a binary "0" may be represented by zero potential.

The representation of binary digits in this manner has heretofore been very effective. However, another manner of representing binary digits in certain circuit components, viz., by alternating potentials of different phases, preferably differing by pi radians, has been proposed. In certain applications, this affords certain advantages such as circuit simplicity, stability and economy. However, in such cases it is frequently necessary to transfer each binary digit from its corresponding potential level to the appropriate alternating potential having a phase representing that digit since the binary information initially appears as different potential levels.

In input circuits heretofore proposed for accomplishing this result, relatively complicated core circuits for effecting a majority decision or circuits utilizing active circuit elements such as vacuum tubes have been utilized.

It is a principal object of this invention to facilitate the transformation of binary information represented by potential values of different magnitudes to binary information represented by alternating potentials of a predetermined frequency and different phases by a relatively simple circuit utilizing passive circuit components.

The foregoing and other objects, features and advantages of the invention will be apparent from the following more particular description of preferred embodiment of the invention, as illustrated in the accompanying drawings.

In accordance with this invention, a pair of parametrons are provided and each has a resonant circuit in which the inductance is varied at a first frequency. Each of the parametrons is thus capable of oscillation at a second frequency. For establishing the phase of oscillation of the parametrons, sources of potential varying at said second frequency each at one of the phases which are mutually pi radians out of phase with each other, are provided. Such reference sources may be reference parametrons. Each reference source is coupled to the resonant circuit of one of the parametrons through a magnetic core and the output of one of the parametrons is coupled through the core to the resonant circuit of the other parametron, in double strength. The resonant circuit of the one parametron is selectively shorted by a winding on a core which, in turn, is selectively saturated by one digit of binary information. Thus, the other parametron oscillates in one phase or another pi radians different, depending on the binary information presented and its output thus presents binary information in the form of alternating potential of a selected phase. That is, when the resonant circuit of the one parametron is unshorted, its double strength coupling predominates over the single strength coupling of the second frequency source and when the resonant circuit of the one parametron is shorted, the second frequency source is applied to the second parametron alone and therefore determines its phase.

Figure 1:
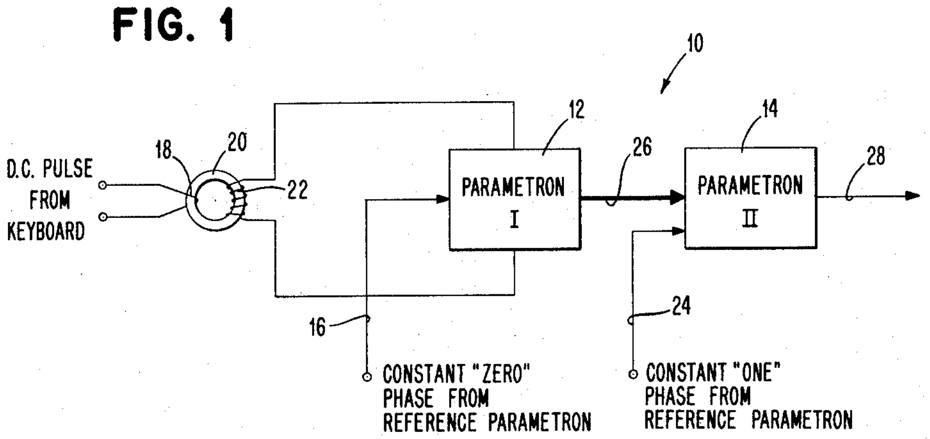
FIGURE 1 represents in block form a system in accordance with this invention.

Referring now to the drawings for a detailed description of the invention, in FIGURE 1, 10 represents the entire input transform system which includes a pair of parametrons 12 and 14. The phase of oscillation of parametron 12 is controlled by the application of a control signal to a line 16 from a source designated "constant 'zero' phase from reference parametron." Parametron 12 is selectively effectively short circuited to produce an output or no output by a direct current pulse applied to a winding 18 on a magnetic core 20, having a secondary winding 22 thereon connected across the resonant circuit of parametron 12. The windings 18 and 22 may have the same number of turns and the pulses applied to winding 18 are of sufficient intensity to saturate the core 20 whereby the inductance of winding 22 is reduced to substantially zero in the saturated condition of this core.

The output of parametron 12 is applied as one input to parametron 14, the other input being applied to a line 24 from a source designated "constant 'one' phase from reference parametron." As indicated by the heavy line 26, the coupling from parametron 12 to parametron 14 is such as to couple the output of parametron 12 in substantially double strength or intensity to parametron 14, as compared with the intensity of application of the signal on line 24. It should be pointed out that the magnitude of oscillations in the parametrons including the reference parametrons is substantially the same whereby the degree of coupling effectively determines the intensity of application of a signal.

According to this description, it is seen that if the application of a pulse to winding 18 represents a binary "one" and the absence of such a pulse represents a binary "zero," an alternating potential is produced at the output line 28 of parametron 14 which is of a certain frequency and "zero" phase for a binary "zero" and "one" phase for binary "one." Conveniently, "zero" and "one" phase may differ by pi radians.

Figure 2:
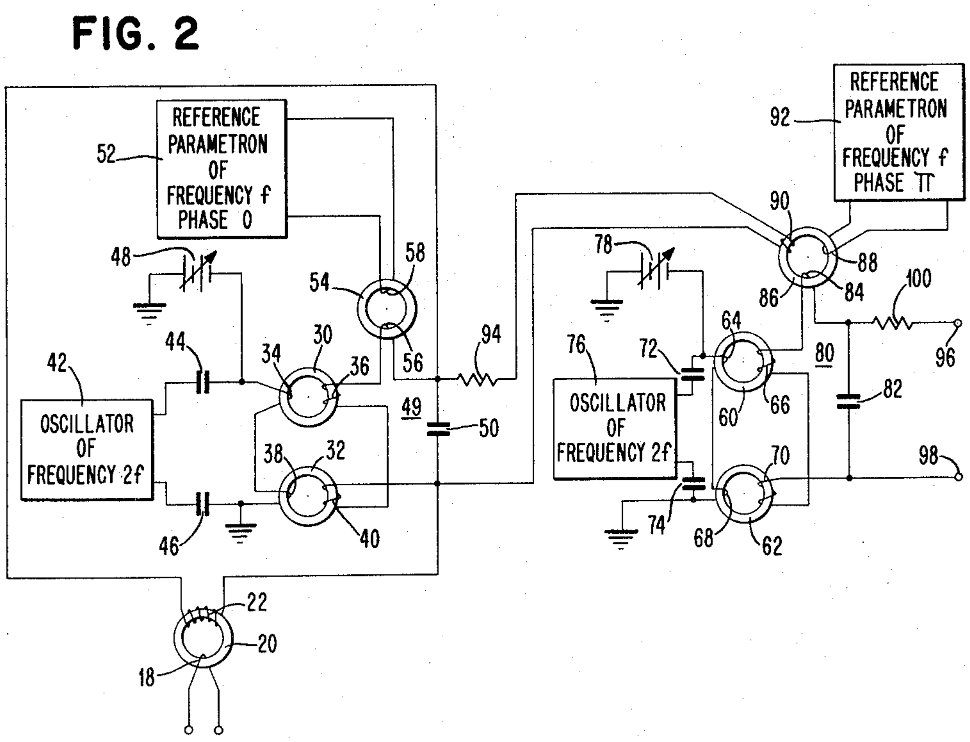
FIGURE 2 is a detailed schematism of a system according to this invention.

The detailed construction and operation of the invention will be clear from a consideration of FIGURE 2 of the drawings. In this figure the details of components in FIGURE 1 are shown and parts which are also shown in FIGURE 1 are represented by the same reference numerals.

In FIGURE 2, parametron 12 is shown as including a pair of magnetic cores 30 and 32 having respective pairs of windings 34, 36 and 38, 40 on the cores. The windings 34 and 38 have substantially the same number of turns and are serially connected across the output of an oscillator 42 of frequency $2f$. A pair of blocking capacitors 44 and 46 are interposed in the line of such connection to facilitate the application of a biasing current to the windings 34 and 38 by a source of variable direct potential 48. One terminal of source 48 is grounded and the other is connected to a terminal of winding 34 and to complete the direct current circuit, a terminal of winding 38 is grounded.

The windings 36 and 40 respectively have more turns than the windings 34 and 38 and are also serially connected but in series opposing relationship with respect to windings 34 and 38 whereby the potentials induced in these windings by the transformer action of windings 34 and 38 and cores 30 and 32 are equal and opposing and thereby cancel each other. For establishing a resonant circuit 49, a capacitor 50 is connected across the windings 36 and 40 in series. The reference parametron supplying a constant "zero" phase potential is shown at 52 and for introducing a signal from this parametron into the resonant circuit 49, a magnetic core 54 is provided with a one turn winding 56 in series with the line between inductor and capacitor of the resonant circuit and a one turn winding 58 connected to the output of reference parametron 52.

In a known manner, by the proper proportioning of circuit values including a magnetomotive force in cores 30 and 32 effective to bias the same along the knees or curved portions of their hysteresis loops, the resonant circuit may be made to support oscillations at frequency $f$ when excited at frequency $2f$ by oscillator 42. However, the phase of such oscillations at frequency $f$ may be established by the phase of reference parametron 52 if the signal therefrom is introduced into the resonant circuit 49 before the oscillations in this circuit begin.

The output of this parametron 12 is taken across the resonant circuit 49 and the presence or absence of an output signal is determined by the absence or presence of an input pulse representing a binary "one." To this end, winding 22 is directly connected across resonant circuit 49. It is thus observed that an energizing direct potential pulse applied to winding 18 effective to pass a current through this winding sufficiently great to substantially magnetically saturate core 20, the winding 22 presents a very low inductance. As a consequence, an effective short circuit for alternating current at the frequencies involved exists across circuit 49 and substantially no output potential appears across the circuit.

Parametron 14 is similar to parametron 12 and includes a pair of magnetic cores 60 and 62 having respective pairs of windings 64, 66 and 68, 70 on the cores. Windings 64 and 68 are of the same number of turns and are serially connected with capacitors 72 and 74 across a source of alternating potential of frequency $2f$ shown as an oscillator 76. Each of windings 66 and 70 preferably has more turns than windings 64 or 68 and these windings are serially connected in opposition so as to cancel induced potentials therein. The cores 60 and 62 are magnetically biased in the nonlinear regions of their hysteresis loops by a source of variable direct potential 78 connected between ground and one terminal of winding 64. One terminal of winding 68 is grounded to complete the direct current circuit. The capacitors 72 and 74 serve as blocking capacitors for direct potentials in the circuit. For establishing a resonant circuit 80 for this parametron, the inductance of windings 66 and 70 connected in series is resonated by the capacitance of a capacitor 82 connected across these windings. In a known manner, circuit 80 may be made to oscillate at a frequency such as $f$ in response to excitation of windings 64 and 68 at frequency $2f$. The phase of the oscillation of circuit 80 may be established by initially introducing a signal at frequency $f$ and of a predetermined phase. Thus, a signal may be induced in a one turn winding 84 on a magnetic core 86 and which winding is in series with the windings of resonant circuit 80.

The core 86 is provided with another single turn winding 88 and a two turn winding 90. The winding 88 is excited by a parametron 92 having an alternating potential of frequency, $f$, and phase, pi, wherein "pi" phase is pi radians with respect to "zero" phase and winding 90 is excited by the output of parametron 12, that is, it is connected across resonant circuit 49. A resistor 94 is interposed in such connection for limiting the current flow.

It is thus observed that winding 88 is continuously energized at frequency $f$ and phase pi by parametron 92 and that in the absence of a pulse applied to winding 18, winding 90 is energized at frequency $f$ and phase 0. However, under these circumstances even though the winding 88 is energized, the signal from parametron 12 predominates over that from parametron 92 by virtue of the fact that winding 90 has twice as many turns as winding 88 and the signal from parametron 12 is therefore coupled to winding 84 in double strength with respect to the signal from parametron 92. On the other hand, upon the application of a pulse signal at winding 18, the output of parametron 12 is reduced to substantially zero and winding 90 is not energized. Accordingly, winding 84 is excited by winding 88 and parametron 14 oscillates at pi phase. The output of parametron 14 is taken at terminals 96 and 98 which are connected across resonant circuit 80 with a current limiting resistor 100 interposed in this connection.

According to the foregoing description it is seen that an effective and simplified circuit apparatus is provided for transforming binary information presented at winding 18 in the form of potential levels to binary information at output terminals 96 and 98 in the form of an alternating potential of one phase or another.

While the invention has been particularly shown and described with reference to preferred embodiment thereof, it will be understood by those skilled in the art that various changes in form and details may be made therein without departing from the spirit and scope of the invention.

What is claimed is:

1. A circuit for transferring the representation of binary digits from different direct potentials to alternating potentials of different phase comprising a first parallel resonant circuit having elements with inductance and capacitance parameters, means for varying one of said parameters at a predetermined rate, a magnetizable core and winding around the core, means connecting said winding across said resonant circuit, means coupled to said resonant circuit for applying a signal thereto of a frequency subharmonically related to said predetermined rate and of a predetermined phase, a second resonant circuit having elements with inductance and capacitance parameters and means for varying one of said parameters at said predetermined rate, means including a core for coupling said first and second resonant circuits, means including turns on said core for applying to said second resonant circuit a signal at said subharmonic frequency and at a phase other than said predetermined phase, the coefficient of coupling obtained by said turns being substantially one-half the coupling between said resonant circuits, and means for selectively saturating said magnetizable core by a direct current pulse whereby an output potential is derived from said second resonant circuit alternating at said subharmonic frequency and being of said predetermined phase in the nonsaturated condition of said core and of said other phase in the saturated condition of said core.

2. A circuit comprising a first parametron and a second parametron, means for selectively energizing each of said parametrons at a predetermined frequency, means coupled to each of said parametrons for applying a control signal of a frequency subharmonic to said predetermined frequency but of different phase to each thereof, means magnetically coupling said first and second parametrons, the coupling between said parametrons having a coefficient substantially twice as great as the coefficient of coupling between said second parametron and said means applying a control signal thereto, and means for selectively interrupting the output of said first parametron.

3. A circuit for transferring the representation of binary digits from different values of direct potential to alternating potentials of different phase comprising a first parametron having a resonant circuit and means for varying the resonant frequency thereof at a predetermined rate, means for selectively applying an effective, electrical short across said resonant circuit, a second parametron having a resonant circuit and means for varying the resoant frequency thereof at said predetermined rate, means establishing a magnetic coupling between the resonant circuits of said parametrons, means for controlling the phase of oscillation of said respective resonant circuits including means for introducing a signal to each of said resonant circuits at a frequency subharmonic to said predetermined rate, the signal applied to the circuit of said second parametron being of a different phase from that applied to the circuit of said first parametron and being applied with substantially one-half the intensity of the signal applied from said resonant circuit of said first parametron to said resonant circuit of said second parametron.

4. A circuit comprising a pair of parametrons each having a resonant circuit and means for varying the resonant frequency of said circuit at the same predetermined rate, means for controlling the phase of oscillation in said resonant circuits and comprising means for applying a signal of a frequency subharmonic to said predetermined rate to said respective circuits with a certain intensity and in different phases, means for coupling the signal across the resonant circuit of said first parametron to the resonant circuit of said second parametron with an intensity substantially twice said certain intensity and means for selectively applying an effective electrical short circuit across the resonant circuit of said first parametron whereby the resonant circuit of said second parametron presents an output signal at said subharmonic frequency and at the phase of one or the other of the phase controlling signals applied to said circuits depending on the presence or absence of said effective short circuit.

5. A circuit comprising a first and a second parallel resonant circuit, means for varying the resonant frequency of said circuits at a predetermined rate, a first magnetic core and a pair of windings on said first core, a first one of said windings being connected across one of said resonant circuits, a second magnetic core, a first winding on said second core being serially interposed in said one resonant circuit, a second winding on said second core and means for applying a potential thereto alternating at a frequency subharmonic to said predetermined rate and having a predetermined phase, a third magnetic core, a first winding on said third core being coupled to said first resonant circuit, a second winding on said third core being serially interposed in said second resonant circuit, a third winding on said third core and means for applying a potential thereto having a frequency substantially equal to said subharmonic frequency and a phase different from said predetermined phase, the first winding on said third core having substantially twice the number of turns as the third winding thereon and means for selectively applying a current through the second winding on said first core effective to saturate the core whereby saturation of said first core is effective to produce an output potential across said second resonant circuit having said other different phase, and desaturation of said first core is effective to produce an output potential across said second resonant circuit having said predetermined phase.

6. A circuit comprising a first and a second parallel resonant circuit each having inductance and capacitance parameters, means for nonlinearly varying one of the parameters of each circuit at a predetermined rate, means for applying an alternating control potential having a frequency subharmonic to said predetermined rate to each of said resonant circuits and in opposite phases to respective circuits, a magnetizable core having a winding thereon connected across one of said resonant circuits, means for selectively saturating said core, means establishing a coupling between said resonant circuits, the coefficient of coupling between said resonant circuits being substantially twice as great as the coefficient of coupling between said second resonant circuit and said means for applying a control potential thereto.

No references cited.